Oct. 3, 1961   C. C. JOHNSON   3,002,407
WIRE STRIPPING TOOL
Filed May 2, 1960
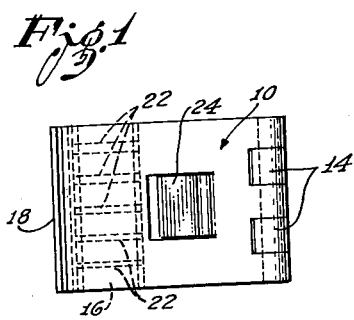
Fig.1
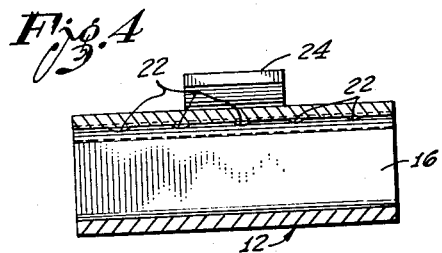
Fig.4
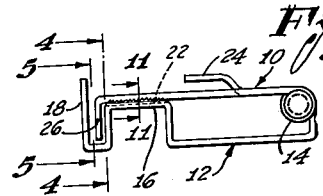
Fig.2
Fig.5
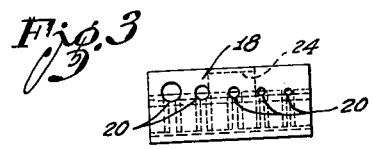
Fig.3
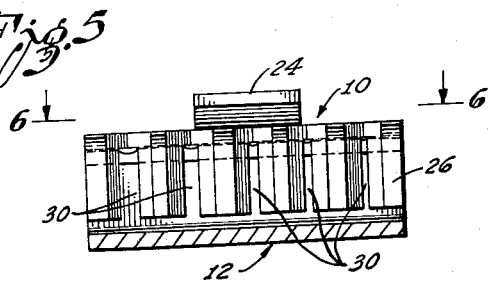
Fig.6
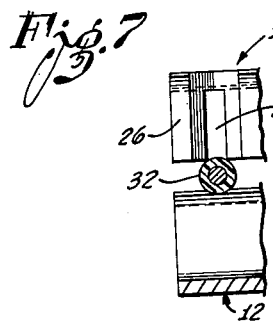
Fig.7, Fig.8
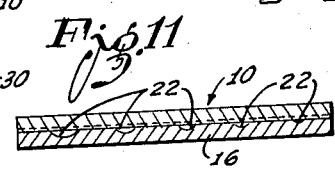
Fig.11
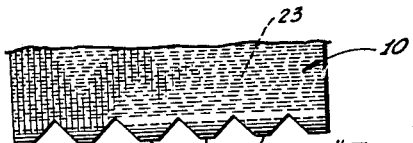
Fig.9, Fig.10
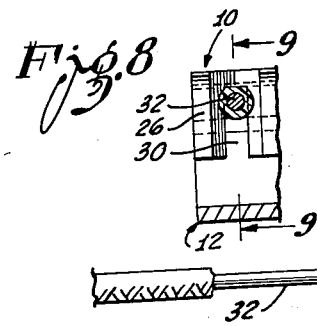
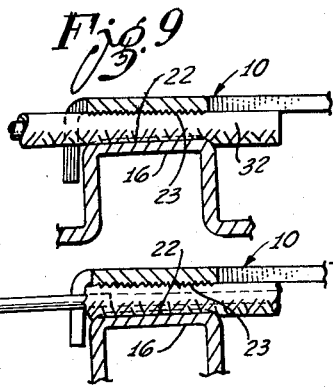
Fig.12
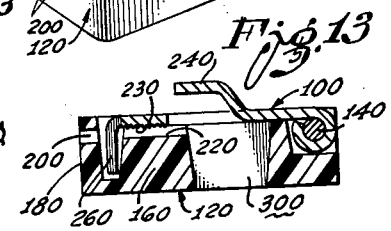
Fig.13
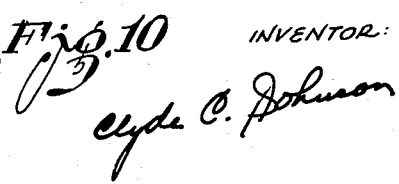
INVENTOR:
Clyde C. Johnson United States Patent Office 3,002,407
Patented Oct. 3, 1961

3,002,407
WIRE STRIPPING TOOL
Clyde C. Johnson, 10213 7th Ave., Inglewood 4, Calif.
Filed May 2, 1960, Ser. No. 25,974
9 Claims. (Cl. 81—9.5)

The present invention relates to improved tools for stripping the insulation from the ends of insulated wire so that appropriate electrical connections can be made by the wire.

It is well known in the electrical and electronic arts to use wire leads for establishing electrical connections from one terminal point to another. These wire leads are often sheathed in insulating material, and the connections are usually made at the terminal points by solder or by similar means. However, before a connection is made, it is necessary to strip and remove a portion of the insulation at the end of the wire to reveal a length of the wire conductor itself, and it is this length of the wire conductor which is soldered, or otherwise connected, to the terminal points.

Wire stripping in the past for the purposes outlined in the preceding paragraph has usually been carried out by means of pliers or similar instruments. However, it is most difficult with such instruments to assure that only the insulating sheath will be removed and that the end portion of the wire conductor itself will not be cut into, scored, or either fully or partially severed.

The present invention, as noted above, provides a unique and improved tool which is especially constructed for the purpose of stripping the insulation from the end of a wire conductor for the purposes described above. The tool of the present invention is advantageous in that it is small and compact, and in that it functions efficiently to perform its intended purpose.

An important feature of the wire stripper tool of the present invention is that it functions quickly and efficiently to strip the insulating sheath from the end of an insulated wire conductor, and it performs this operation without any tendency whatever to mar, score, or in any way cut into the wide conductor itself.

Another feature of the wire stripper tool of the present invention is that it permits insulated wire conductors to have their ends stripped of insulation to any desired length by means of an extremely simple operation. It is merely necessary to insert the end of the insulated wire into the tool of the present invention to an extent corresponding to the length of insulation which is to be stripped from the wire. The tool is then clamped down on the wire by manual pressure, and the wire is manually withdrawn from the tool. Such a withdrawing of the wire causes the insulation from the length of wire inserted into the tool to be severed and removed. Moreover, and as noted above, this removal of the insulating coating is carried on without affecting in any manner the wire conductor itself.

Another feature of the improved wire stripper tool of the invention is that the wire stripper embodying the concepts of the invention may be constructed to handle a large variety of wires sizes. Moreover, many different types of insulating sheaths, such as plastic, woven cloth, and other types, may be stripped from the wire conductor quickly and cleanly by means of the instrument of the invention.

Yet another feature of the invention is that the wire stripper instrument constructed in accordance with the invention can be fabricated to include stripping blades of long wearing material and the blades can be constructed to be actually self-sharpening as they are used.

The wire stripper of the present invention also may be constructed so that the portion of the insulation stripped from the end of the conductor by each wire stripping operation is tightly held in the tool itself to be disposed of at will. This latter feature is advantageous in that it obviates the undesired practice of allowing the stripped insulating pieces to fall indiscriminately around the work area.

The above and other features and advantages of the invention will become apparent from a consideration of the following description, when the description is taken in conjunction with the accompanying drawings, in which:

FIGURE 1 is a top plan view of a first embodiment of the wire stripper tool of the invention which is composed of flat configured metallic members;

FIGURE 2 is a side view of the wire stripper tool of FIGURE 1 and showing the manner in which the metallic jaw members which form the tool are shaped and hinged to one another to perform the intended function of the tool;

FIGURE 3 is a front elevational view of the wire stripper of FIGURE 1 and showing particularly how a plurality of openings may be formed in the tool to receive a corresponding plurality of different wire sizes;

FIGURE 4 is a sectional view of the wire stripper of FIGURE 1, taken substantially on the line 4—4 of FIGURE 2 and showing particularly a plurality of grooves formed in one of the jaw members of the tool to hold the wires inserted in the tool in proper position for stripping purposes;

FIGURE 5 is a sectional view of the wire stripper of FIGURE 1, taken substantially on the line 5—5 of FIGURE 1, this latter view showing particularly the cutting edges which are formed in the other jaw member of the tool;

FIGURE 6 is a top fragmentary view of the wire stripper tool of FIGURE 1, taken substantially on the line 6—6 of FIGURE 5, and showing the formed edge of the other jaw member of FIGURE 5 as seen from the top;

FIGURE 7 is a fragmentary functional view of the instrument of FIGURE 1, showing an insulated wire inserted between the jaws of the tool in preparation for the removal of the insulating sheath from the end of its wire conductor;

FIGURE 8 is a fragmentary functional view of the instrument of FIGURE 1, showing the insulated wire of FIGURE 7 after the jaws of the wire stripper instrument have been clamped down on the wire and after the cutting edges of the instrument have cut through the insulated sheath without touching the wire conductor itself;

FIGURE 9 is a view, like FIGURE 8, and along the line 9—9 of FIGURE 8, to show a side view of the jaws of the wire stripper instrument, and illustrating the wire conductor after the jaws have been clamped down on the wire, and this view also showing clearly how the end of the insulating sheath is firmly held between the jaws of the instrument while the cutting is taking place;

FIGURE 10 is a view, like FIGURE 9, and shows the stripping action of the tool as the wire is pulled out of the tool while its jaws are maintained firmly clamped on the insulating end section;

FIGURE 11 is a fragmentary sectional view, substantially on the line 11—11 of FIGURE 2, and illustrating how a groove is formed in a cross member of the tool to hold the end of the insulated conductor firmly in the tool while the stripping is being carried out and to hold the stripped end portion of the insulated sheath in the tool after the stripping operation has been completed;

FIGURE 12 is a perspective view, approximately full size, of a second embodiment of the wire stripper of the present invention, the latter embodiment including a metal blade which is hingedly mounted in a plastic body portion; and FIGURE 13 is a sectional view of the embodiment of FIGURE 12, substantially on the line 13—13 of FIGURE 12, and showing the manner in which the plastic body and hinged metal blade are shaped and attached to one another to enable the wire stripper instrument to perform its intended function.

The embodiment of the invention shown in FIGURES 1–11 includes a pair of jaw members 10 and 12 which are hinged together by a suitable hinge 14. The jaw members 10 and 12 are formed of rigid flat metallic strips, which are configured (as will be described) to the illustrated shape so that the wire stripper tool of the invention may perform its intended function.

The lower jaw member 12 may be considered to be the body portion of the tool. This portion is shaped to define a supporting cross member 16 which has a flat upper surface. The lower jaw 12 is also shaped to form an end wall 18. The end wall 18 is spaced from the forward side of the supporting member 16, and a channel is formed between the wall and the forward side of the supporting member. The front wall 18, as shown in FIGURE 3, for example, has a plurality of apertures 20 extending through it. These apertures are of different sizes, and they are intended to accommodate different wire sizes.

The top surface of the supporting member 16 has a plurality of grooves 22 (FIGURE 11) formed in it, and these grooves extend across the top surface of the supporting member 16 along respective axes which are essentially perpendicular to the plane of the end wall 18. The grooves 22, moreover, are disposed in respective axial alignment with corresponding ones of the apertures 20 in the end wall 18. The underside of the upper jaw member 10, on the other hand, has a plurality of serrations 23 which extend transversely to the grooves 22 in the supporting member 16.

The upper jaw member 10 has a thumb tab 24 formed in it which permits the jaw members to be moved to an open position by a simple thumb-actuated movement. The upper jaw member 10 may be considered the blade member of the tool, and it includes a right-angled bent-over extremity 26. When the upper jaw member 10 is moved down to a closed position with respect to the lower jaw member 12, the upper jaw member is moved down on the top surface of the support member 16, and its bent-over extremity 26 moves down into the channel between the end wall 18 and the supporting member 16.

The bent-over extremity 26 of the blade member 10 has a plurality of grooves or slots 30 formed in it (FIGURE 5). These slots are disposed to be in respective axial alignment with corresponding ones of the apertures 20 when the upper jaw member 10 is moved down on the lower jaw member 12, and when the extremity 26 enters the transverse channel between the end wall 18 and the supporting member 16. The slots 30 in the extremity 26 are of different sizes, to accommodate the different sized insulated wires, which are intended to be inserted through different ones of the apertures 20 in the end wall for stripping purposes.

The slots 30 each have a pair of blade-like cutting edges respectively formed adjacent their sides. The dimensions of the slots 30 are such that when an insulated wire is inserted through one of the holes 20 and along one of the grooves 22 in the support member 16, the wire is engaged by the corresponding slot 30 in the extremity 26 when the jaws of the tool are closed, and the cutting edges extend into the insulating sheath at least partially to sever the end portion of the sheath. However, the dimensions of the particular slot 30 are such that the blade-like edges do not cut into the wire itself. During these operations, the wire is securely held in place by the gripping action of the transverse serrations 23 in the underside of the jaw member 10.

The above operations are best illustrated in FIGURES 7–10. In those figures, it will be noted than an insulated wire 32 is inserted in one of the holes 20 in the end wall 18, and the inserted end of the wire extends along the top surface of the supporting member 16 in one of the grooves 22. When the jaws of the tool are closed down on the wire, the corresponding slot 30 in the bent-over extremity 26 of the upper jaw member moves down over the wire, as the jaw members move from the position of FIGURE 7 to the position of FIGURE 8. As best shown in FIGURE 8, the particular slot 30 has such a width that the cutting edges disposed adjacent the sides of the groove cut into the insulating sheath of the insulated wire 32, but do not cut into the wire itself.

As best shown in FIGURE 9, the end of the wire 32 is firmly held in the corresponding groove 22 on the top surface of the supporting member 16 by the serrations 23 in the underside of the jaw member 10 when the jaws of the instrument are closed together. Then, as the wire is withdrawn, and as shown in FIGURE 9, the end portion of the insulating sheath is held in the instrument, so that the portion of the insulating sheath at the end of the wire is stripped. Moreover, and as mentioned previously, the stripping is such that the wire conductor itself is not scored, marred or in any way cut into.

In the embodiment of FIGURES 12 and 13, the lower jaw member of the tool is designated as 120, and that member is formed of a hard plastic material. The upper jaw member is designated as 100, and it may be similar in its composition to the upper jaw member 10 of the embodiment described above. The upper jaw member has a similar thumb-actuated tab 240. Moreover, the upper jaw member 100 is hinged to the plastic body portion 120 by means of an appropriate hinge 140. The upper jaw member 100 has a bent-over extremity 260 which, likewise, may be similar to the extremity 26 in the embodiment described above. A plurality of transverse serrations 230 are formed on the underside of the upper jaw member 100.

An integral cross supporting member 160 is formed in the body portion 120, and the supporting member is spaced from the end wall 180 of the body portion. The end wall 180 and the supporting member 160 form a transverse channel to receive the extremity 260 of the jaw member 100 when the jaw member is moved down onto the body member.

The end wall 180 has a plurality of apertures 200 which serve to receive different wire sizes. Moreover, the supporting member 160 includes a plurality of grooves 220 which are in respective axial alignment with corresponding ones of the apertures 200. The operation of the two illustrated embodiments of the invention are similar, and the operation will not be repeated in detail for the latter embodiment. It will be noted, however, that when an excessive length of insulation is to be stripped from the end of a wire, the excessive length of the wire may protrude through the open sides of the tool of the first embodiment. However, the tool of the second embodiment is formed with side walls, and the excessive length may protrude down through the opening 300 in that embodiment.

The invention provides, therefore, a simple, compact and inexpensive tool which serves efficiently and quickly to permit the insulating sheath to be severed and stripped from the end portion of a wire conductor. When the insulated wire conductor is inserted into the tool, it is firmly and rigidly held in the tool and centered in the cutting groove. Then, when it is withdrawn, the end of its insulation is efficiently and quickly stripped from the wire conductor. Moreover, and as mentioned above, this is achieved without marring or scoring the conductor itself in any manner.

I claim:

1. A wire stripper tool for stripping the end portion of an insulating sheath from an insulated wire conductor enclosed and insulated by such a sheath, said wire stripper including: a first jaw member, a second jaw member, hinge means affixed to one end of each of the jaw members to join the jaw members in a hinged relationship, the intermediate portion of one of the jaw members forming a supporting means including a surface configuration for receiving and the other of said jaw members having a surface configuration for gripping the end portion of the insulating sheath of the insulated wire conductor, and blade means formed at the free end of at least one of the jaw members for causing the end portion of the insulated sheath to be stripped from the wire conductor gripped in the tool as the insulated wire conductor is withdrawn from the tool.

2. A wire stripper tool for use with a wire conductor, which wire conductor is enclosed by an insulating sheath and the wire stripper serving to enable an end portion of the insulating sheath to be stripped from a corresponding end portion of the wire conductor, said wire stripper including: a first jaw member including an end wall having at least one opening therein and further including a supporting member spaced from said end wall and having an upper surface with at least one longitudinal groove therein in axial alignment with the opening in said end wall, and a second jaw member affixed to said first jaw member in hinged relationship therewith, said second jaw member having a free extremity positioned and shaped to extend between the support member and the end wall of said first jaw member when the second jaw member is moved down on said first jaw member and further having an intermediate portion with transverse serrations therein in facing relationship with the upper surface of said supporting member when the second jaw member is moved down on the first jaw member, and said free extremity of said second jaw member having at least one groove formed therein in a position to be aligned with the opening in said end wall of said first jaw member when said second jaw member is so moved down on said first jaw member, and said extremity of said second jaw member further having at least one cutting edge disposed adjacent said groove.

3. The combination defined in claim 2 in which said end wall and said supporting member of the first jaw member are formed of a single configured metallic strip.

4. A wire stripper tool for use with a wire conductor, which wire conductor is enclosed by an insulating sheath and the wire stripper serving to enable and end portion of the insulating sheath to be stripped from a corresponding end portion of the wire conductor, said wire stripper including: a body portion including an end wall having at least one opening therein for receiving the end portion of the wire and of the insulating sheath enclosing the wire, said body portion further including a support member positioned in spaced and parallel relationship with the end wall and having at least one groove formed on the top surface thereof with said groove extending perpendicular to said end wall and being positioned in axial alignment with the opening in the end wall to receive the end portion of the wire and of the insulating sheath enclosing the wire, and a blade member mounted on said body portion in hinged relationship therewith for rotational movement about an axis spaced and parallel to the support member and on the side thereof remote from the end wall, said blade member having a bent-over right-angled extremity positioned and shaped to extend down between the support member and the end wall when the blade member is moved down on said body portion, said extremity having at least one groove formed therein in a position to be aligned with the opening in said end wall when the blade member is so moved down on said body portion and said extremity having cutting edges disposed adjacent the sides of the groove, said groove having dimensions such that the cutting edges may enter the insulating sheath of the wire inserted through the opening in the end wall to enable the end portion thereof to be stripped from the wire and having dimensions such that the cutting edges are clear from the surface of the wire itself.

5. The combination defined in claim 4 in which the blade member includes a serrated surface which holds the end portion of the insulating sheath firmly against the support member when the blade is so moved down on said body portion.

6. A wire stripper tool for use with a wire conductor, which wire conductor is enclosed by an insulating sheath and the wire stripper serving to enable an end portion of the insulating sheath to be stripped from a corresponding end portion of the wire conductor, said wire stripper including: a body portion including an end wall having at least one opening therein and further including a pair of side walls, a cross member mounted in said body portion to extend between said side walls in spaced relationship with said end wall and having at least one groove formed in the top surface thereof in axial alignment with the opening in the end wall, and a blade member mounted on said body portion in hinged relationship therewith for rotational movement about an axis spaced from said cross member on the side thereof remote from said end wall, said blade member having a free extremity positioned and shaped to extend down between the cross member and the end wall when the blade member is moved down on said body portion, and said extremity having at least one groove formed therein in a position to be aligned with the opening in said end wall when said blade member is so moved down on said body portion and said extremity further having cutting edges disposed adjacent the groove therein.

7. A wire stripper tool for use with a wire conductor, which wire conductor is enclosed by an insulating sheath and the wire stripper serving to enable an end portion of the insulating sheath to be stripped from a corresponding end portion of the wire conductor, said wire stripper including: a body portion including an end wall having at least one opening therein for receiving the end portion of the wire and the end portion of the insulating sheath enclosing the wire and further including a pair of side enclosing the wire and further including a pair of side walls, a cross member mounted in said body portion to extend between said side walls in spaced parallel relationship with said end wall and having at least one groove formed on the top thereof and extending perpendicular to said end wall in axial alignment with the opening in the end wall to receive the end portion of the wire and of the insulating sleeve enclosing the wire, and a blade member mounted on said body portion in hinged relationship therewith for rotational movement about an axis spaced and parallel to said cross member and on the side thereof remote from said end wall, said blade member having a bent-over right-angled extremity positioned and shaped to extend down between the cross member and the end wall when the blade member is moved down on said body portion, said extremity having at least one groove formed therein in a position to be aligned with the opening in said end wall when the blade member is so moved down on said body portion and said extremity having cutting edges disposed adjacent the sides of said groove therein, said groove in the bent-over extremity having dimensions such that the cutting edges may enter the insulating sheath of the wire inserted through the opening in the end wall to enable the end portion of the insulating sheath to be stripped from the wire and having dimensions such that the cutting edges are clear from the surface of the wire itself.

8. The combination defined in claim 7 in which said body portion and said cross member are formed of a hard plastic material.

9. The combination defined in claim 7 in which the blade member includes an intermediate portion having a lower transversely serrated surface for holding the end portion of the insulating sheath firmly in the groove of the cross member when the blade member is so moved down on said body portion.

References Cited in the file of this patent

UNITED STATES PATENTS

| | | |
|---|---|---|
| 2,133,005 | Wollenweber | Oct. 11, 1938 |
| 2,386,327 | Martin | Oct. 9, 1945 |
| 2,627,768 | Cook | Feb. 10, 1953 |
| 2,795,982 | Mathias | June 18, 1957 |